United States Patent [19]
Elliason et al.

[11] Patent Number: 5,644,173
[45] Date of Patent: Jul. 1, 1997

[54] REAL TIME AND/SHED LOAD BASED ON RECEIVED TIER PRICING AND DIRECT LOAD CONTROL WITH PROCESSORS FOR EACH LOAD

[76] Inventors: Kurt L. Elliason, 12725 54th Ave. North, Plymouth, Minn. 55422; Robert J. Schnell, 15415 47th Ave. No., Plymouth, Minn. 55446; Philip J. Bohrer, 5900 Amy Dr., Edina, Minn. 55436; Gregory J. Merten, 3753 Windtree Dr., Eagan, Minn. 55123-1335

[21] Appl. No.: 329,731

[22] Filed: Oct. 25, 1994

[51] Int. Cl.$^6$ .................................................. H02J 3/14
[52] U.S. Cl. ........................ 307/34; 307/29; 307/38; 364/226.8; 364/464.01; 364/464.04; 364/923; 324/142; 340/870.02
[58] Field of Search ................ 307/34, 38, 29; 364/492, 464.01, 464.04, 923, 226.8; 340/870.02; 324/142

[56] References Cited

U.S. PATENT DOCUMENTS

| | | |
|---|---|---|
| 3,656,112 | 4/1972 | Paul . |
| 3,900,842 | 8/1975 | Calabro et al. . |
| 4,349,879 | 9/1982 | Peddie et al. ............................ 364/492 |
| 4,429,299 | 1/1984 | Kabat et al. . |
| 4,510,398 | 4/1985 | Culp et al. . |
| 4,556,865 | 12/1985 | Fukagawa et al. . |
| 4,642,607 | 2/1987 | Strom et al. . |
| 4,909,041 | 3/1990 | Jones . |
| 4,916,328 | 4/1990 | Culp, III . |
| 5,003,457 | 3/1991 | Ikei et al. . |

*Primary Examiner*—William M. Shoop, Jr.
*Assistant Examiner*—Albert W. Paladini
*Attorney, Agent, or Firm*—Robert B. Leonard

[57] ABSTRACT

A method of employing add/shed routines to individual load controllers in a system for a building or plant that has more than one load. It allows for cooperative adjustments of energy usage in accord with prearranged exigency information agree between the utility provider and the building user. Duty cycle time is also adjustable in accord with tier level signal information provided by the utility.

11 Claims, 14 Drawing Sheets

REAL TIME AND/SHED LOAD BASED ON RECEIVED TIER PRICING AND DIRECT LOAD CONTROL WITH PROCESSORS FOR EACH LOAD

This invention relates to reducing energy costs (in conjunction with time-of-use pricing with rates that vary according to energy costs) and has particular application to home control and building control in general and is useful in areas supplied by electric utilities that wish to engage in demand side management of their area. It is particularly addressed to add/shed load control in the control of facilities that have individual processors for subsystems to which add/shed load control may be applied. It also allows for direct load control (DLC) by the utility provider in a cooperative system.

BACKGROUND OF THE INVENTION

As it becomes more expensive for electricity providers to increase generation, distribution and transmission capacity, a number of strategies for coping with increasing electrical demand have emerged. One of these is called demand side management in which the users of electricity themselves are adapted to reduce the amount of electricity they use during times of peak power usage as well as in other similar situations. The invention herein provides a way to adapt users of electricity to reduce their demand through an add/shed strategy which can be applied in real time and in cooperation with consumer needs. Thus by communicating the (time-of-use) energy price rate or tier to a control system within the customer's premises, the control system can reduce the energy consumption within the premise during times when the cost of energy is high. The utility in turn can reduce the necessary generating capacity for a given area.

Previous ways to deal with related problems of reducing energy consumption in buildings using add/shed strategies, or in general, are described in U.S. Pat. Nos. 4,510,398; 4,916,328 and 4,909,041. Nevertheless there is no reason why this invention could not be used in non-residential buildings or even in industrial processes that consume electric power, provided that an add/shed load strategy makes sense.

BRIEF DESCRIPTION OF THE DRAWINGS

FIGS. 4b–r (there is no FIG. 4j) are ordered sets of displays in accord with one embodiment of this invention available to the user through the display illustrated in FIG. 4a.

SUMMARY OF THE INVENTION

A controller for controlling the energy-consuming equipment and systems in a building which may benefit from changing utility rate information is taught in this invention. The controller sends price tier information to the individual controllers for the add/shed loads (also called subsystems). Each of these contain information indicating the appropriate action that the load should take based on whether there is a user override and whether there is direct utility control as well as on tier information.

All the add/shed decisions will occur based on the predetermined information about the value of the particular processor's load stored in memory associated with the system.

The controller in the building will have a gateway for communicating the tier and DLC signals to the controller from the utility. A significant amount of variability is available to the designer employing the invention described herein, which should only be considered limited by the claims.

DETAILED DESCRIPTION OF THE PREFERRED EMBODIMENT

Figure 1:
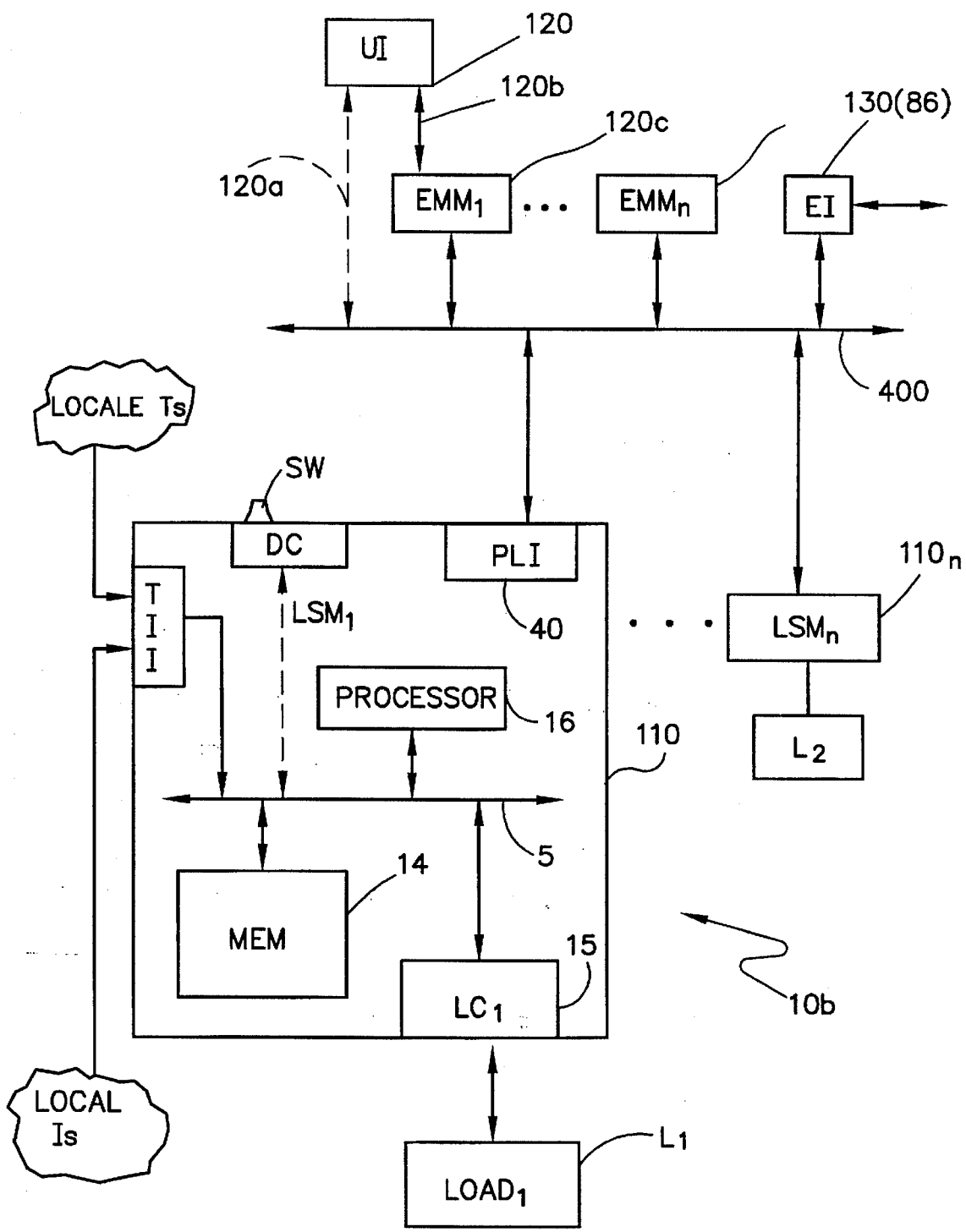
FIG. 1 is a conceptual block diagram of one form of the preferred embodiment of the invention.

FIG. 1 describes the control system 100 including a controller 110, the system 100 having in the preferred embodiment a user interface 120 (which may be connected to the power line through another controller 120c via lines 120b or directly through 120a). The controller 110 preferably includes memory subsystem 14, load control interface 15 and power line interface 40; each of which communicate with a processor 16, either through direct connections or via a controller bus like bus 5. In the preferred embodiment, a communications interface to the utility (called an External Interface) EI 130 is connected to the controller through power line interface 400. The controller 110 may send output signals to load $L_1$, and the user interface 120 as desired by the user for controlling the load that is controlled by the controller 110. Many such controllers 110 to $110_n$ may be included on the power line 400 and each operates to add/shed its load(s) independently.

In one embodiment, the controller 110 may be enhanced and have the benefit of local information for making its decision regarding adding/shedding loads or other tasks it might be assigned. In this Figure, this is illustrated by having a local temperature sensor Ts and a local current sensor Is provide signal input to a current and temperature interface TII which, in turn, can communicate these signals in an intelligible manner to the processor 16 via bus 5.

A preferred bus structure for setting up the interfaces between the controller and the other components is described with reference to FIG. 1A. A number of companies currently provide a universal interface for home control, for example "H-Bus™" (a product available through Honeywell Inc. of Minnesota) which here could operate as controller bus 81. This bus would allow for communications of data and control signals between the various components that may be attached to bus 81 (here, for example, actuator 18 and H-Bus interface 91. The H-Bus™ system, for example, provides for a DC balanced, limited set of code words which all systems may read and which only appropriate systems will react to. Alternative busses are well known and, as the art develops, new busses will become known and the most efficient bus for the appropriate situation should be employed by the designer.

Figure 1A:
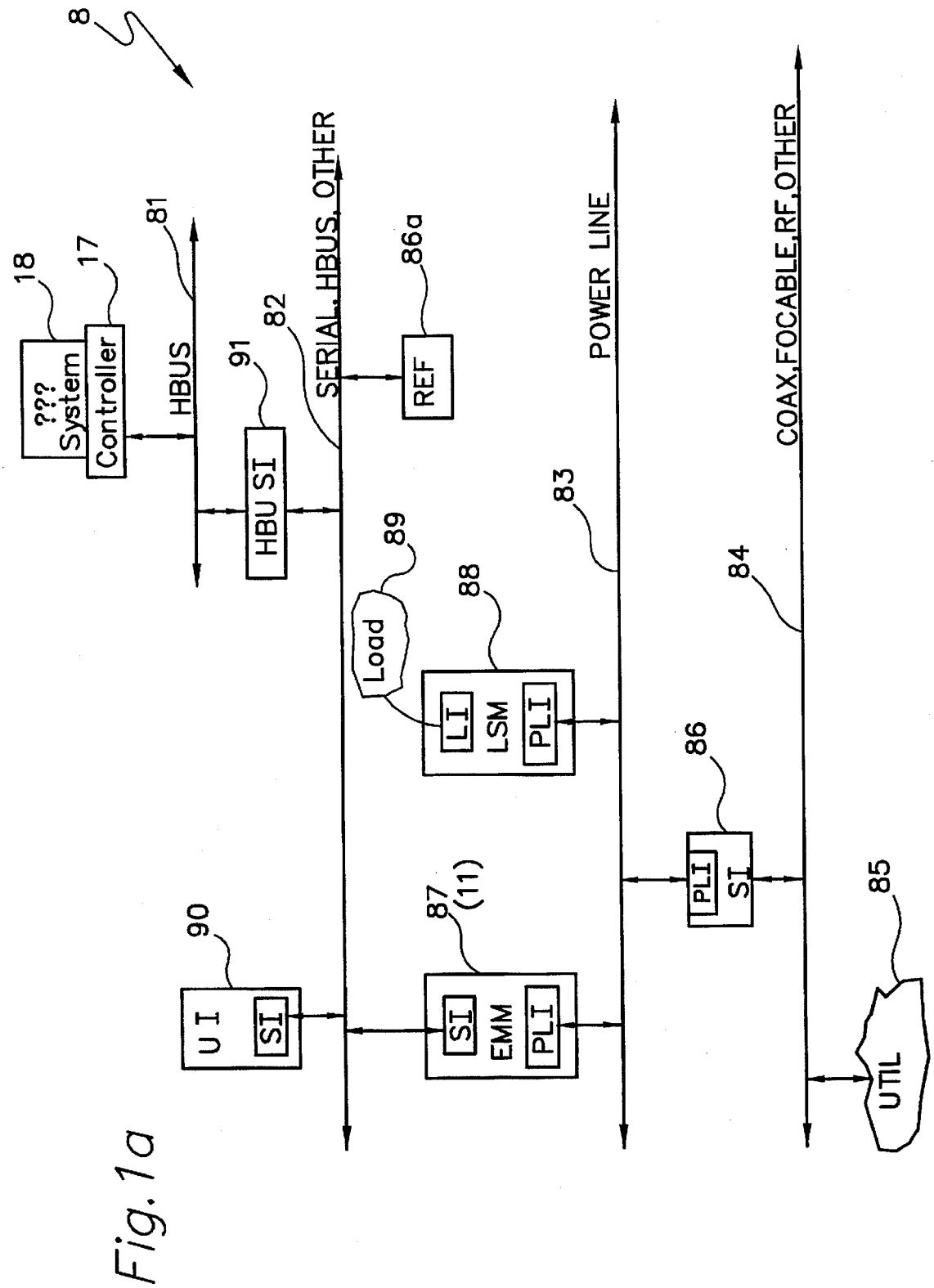
FIG. 1A is a conceptual block diagram of a preferred embodiment bus structure for the invention.

In the illustration of FIG. 1A, H-Bus™ interface 91 merely provides for communications between two busses, 81 and 82, where bus 82 may be, alternatively, another H-Bus™, or perhaps even a power line used as a bus. The bus 82 side of interface 91 will, of course, have to be adapted to the particular situation. In this situation, for example, controller 17 could connect directly to bus 82 if it were an H-Bus™, and interface 91 would not be needed.

The external interface 86 to the utility 85 in the preferred embodiment interfaces with a utility provided coaxial cable 84 although there are many ways the utility pricing signal could be fed into the system 8 (for example, RFI 86a could receive RF signals). Likewise, fiber-optic cable or the power lines themselves may be used if desired.

In some embodiments this communication can be two-way, to also provide data back to the utility. The utility may use such a system to determine which customers have active overrides of DLC signals, for example.

Many different forms of external interface may be employed without going beyond the scope of this invention and these are described in more detail below with reference to FIG. 2. The controller 87 (11) resides on both a serial bus 82 and on the power line which here is also used for communicating data. The user interface 12 preferably also resides on the same serial bus 82. A power line interface (PLI) (which may also be provided to all communicating systems on the power line) will, in the minimum configuration for using a power line interface, provide signals from the controller through the power line 83 to systems that function through power line controllers (for example, LSM controller module 88 which controls load 89). In the simplest case, a light (which might be load 89) could be turned on or off at various times of the day or according to various other factors taken into consideration by the controller 88. Many other configurations based on this example should be readily apparent to those of ordinary skill in this art.

Figure 2:
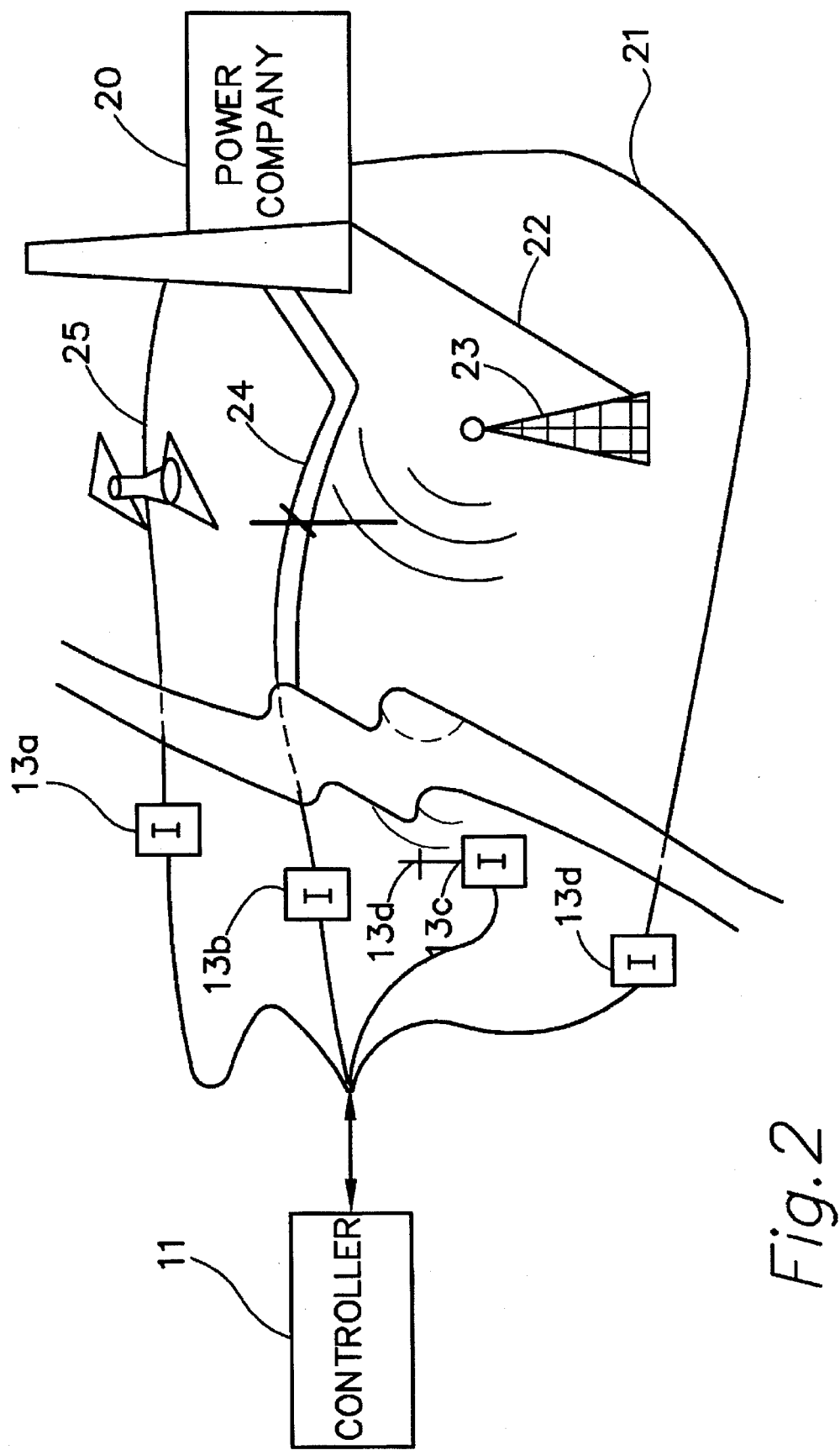
FIG. 2 is a conceptual block diagram of the power supplier's or company's interface to a controller in one preferred embodiment of the invention.

Referring now to FIG. 2, potential forms of interface from the power company 20 to the controller 11 are described. Each one of these has strengths and weaknesses which may be overcome by others. A telephone line 25 may connect an interface 13a to the controller in a house or in a building, for instance, or a direct line 21 may go directly to the interface box 13d which connects to the controller 11. If the power company opts to send signals through the power lines 24 themselves to interface box 13b, a number of problems may develop with the carrying of such signals through the transformer network currently employed by electric utility companies, for example. Some combination of power line and radio wave signals may be employed such as, for instance, having a radio receiver at every transformer in a locality wherein the radio receiver would send an appropriate signal over the power lines after the transformer into the individual's houses or buildings or, a small area may be blanketed in which each house has a box 13c with an antenna 13d which receives RF signals from an output antenna 23 from the power company on line 22. As with the previous two diagrams, many combinations of the above will occur to the designer of ordinary skill in the art without leaving the scope of this invention. In the presently preferred embodiment, the utility signals the user's facility/home/ building via a coaxial cable. This signal is transferred into the facility's internal power lines, where a power line interface receives the signals.

Figure 3:
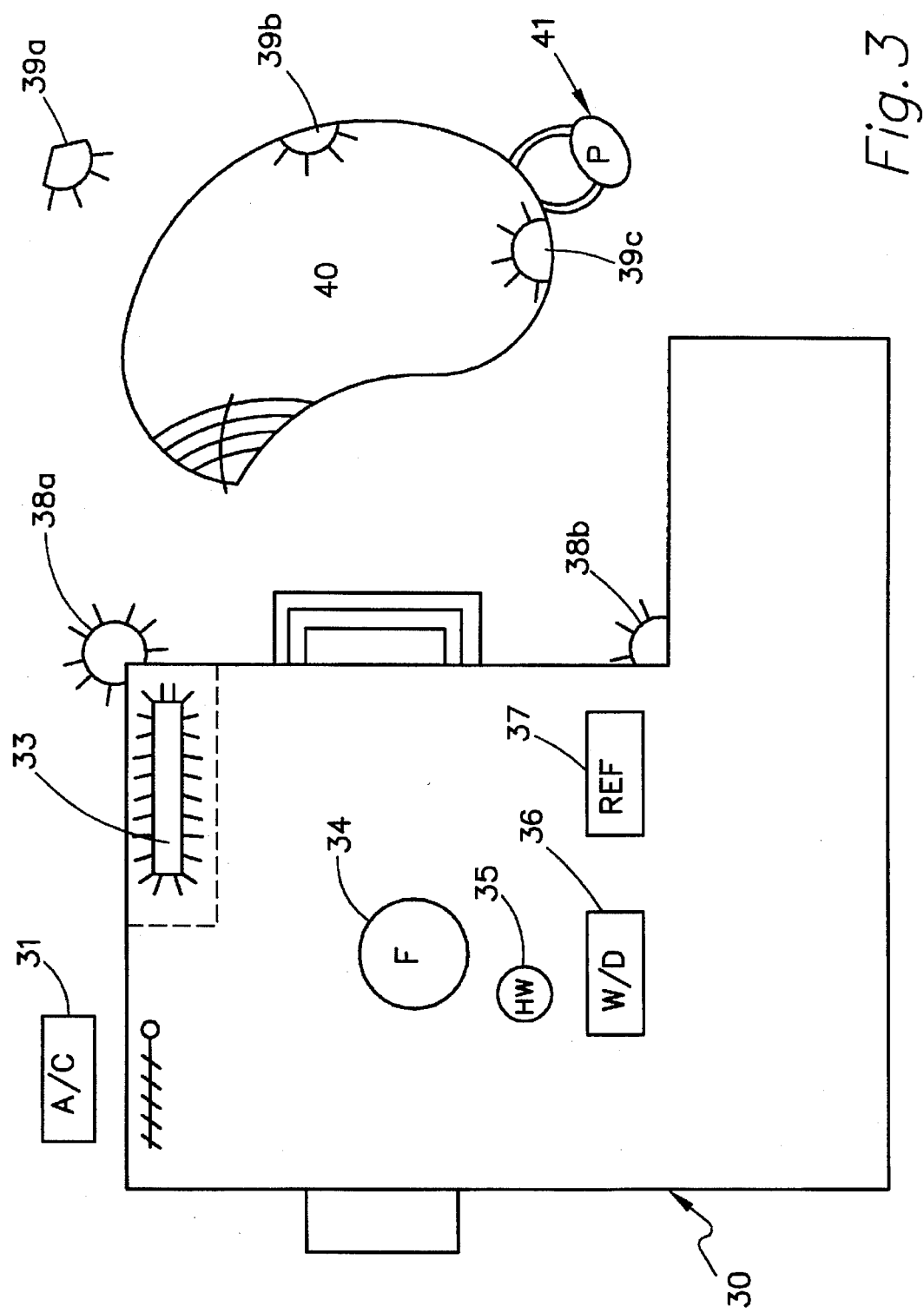
FIG. 3 is a two-dimensional overview diagram of a house which may be employed having a number of systems controllable in accord with one of the preferred embodiments of the invention.

FIG. 3 has a collapsed floor plan of a house 30 and pool 40 showing various subsystems 31–39 and 41, which are controllable through the use of this invention. The air conditioning subsystem 31 and the furnace or heating subsystem (preferably electric) 34 generally will work together through a thermostat (not shown). In sophisticated houses a vertical-blind-turning motor or curtain-moving motor 32 could be provided to reduce heat load or increase heat load provided by the sun on rooms in a building through a window. However this invention is preferably applied to, for example, various lighting subsystems which may be controlled individually such as plant lights 33 in an arboretum, exterior security lights 38a and 38c and exterior pool lights 39a–c. A hot water heater 35, washer/dryer 36, refrigerator 37 and pool pump 41 provide other examples of subsystems which may also be controlled by use of this invention if desired.

Briefly referring back to FIG. 2, it can easily be seen that various controller interfaces such as 13a, 15d, 13b and 16 may be employed for controlling these subsystems of the user's homes.

For example, the security light system 38a and 38b (FIG. 3) may be turned on at all times during the evening hours, regardless of cost, in a high-crime neighborhood. Likewise, beyond a certain price tier or level, the pool pump subsystem 41 and outdoor pool lights 39a–c would likely be turned off (shed) any time price of power for them reaches a certain tier. As would occur to the reader, there may be times that an owner/occupier of a building space would prefer to override a standard program and this can be included as well.

Some systems of the typical house however, will preferably have their setpoints adjusted rather than either being simply turned on or off based on the price point provided by a utility. The most common example currently would be the heating and air conditioning system in the typical residential home or commercial building. Typically, setback thermostats have become well distributed within the United States and are well known elsewhere. These thermostats allow for programming by the occupant to accommodate his schedule. The simplest version would have two modes or periods, a high and a low, but most have at least four. These have been called various things but commonly may be referred to as period: WAKE, LEAVE, RETURN and SLEEP, which may roughly be interpreted as warm up the house in the winter because the occupant is waking, the occupant is leaving so reduce power consumption for maintaining the comfort in a space, the occupant is returning and wants a higher level of comfort, and the occupant expects to be asleep and therefore a different temperature and comfort level is required. An exemplary unit is produced by Honeywell Inc. and goes by the trademark "Magicstat™", and provides these four modes for the occupant to program.

The invention herein, with reference to this subsystem of heating, ventilation and air conditioning (HVAC) control may operate at various levels of complexity depending upon the subsystems and controllers available in the house or building. For use with the add/shed load control, even the duty cycle may be adjusted, but in the simplest form it merely determines whether the load will be turned off or left alone.

Figure 5:
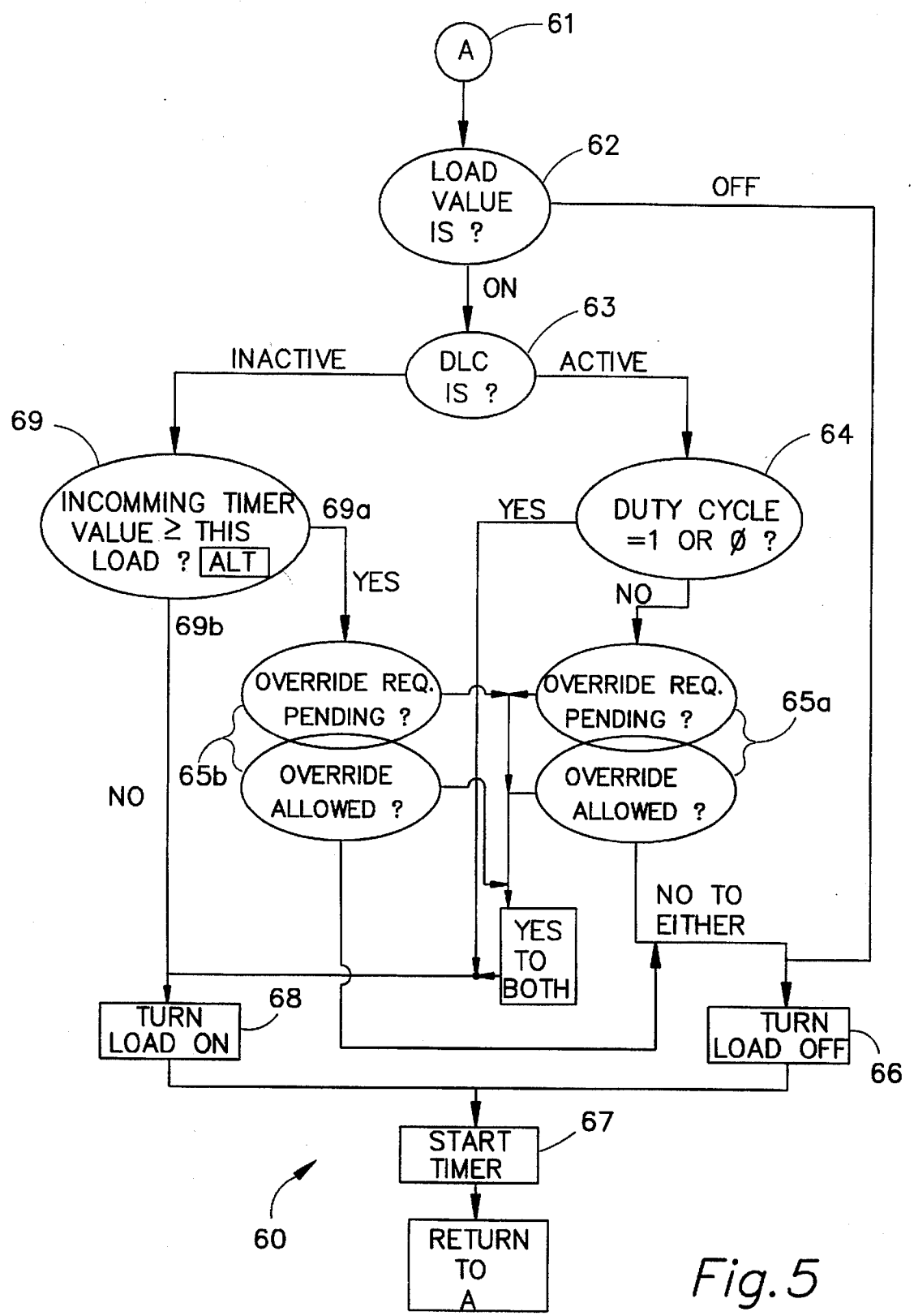
FIG. 5 is a flow diagram illustrating how a preferred embodiment uses the add/shed strategy to adjust to incoming signals.

FIG. 5 describes how the signals provided by the utility company are incorporated into the preferred embodiment system 60. When the signal comes in from the utility (or at any other time chosen by the designer as appropriate to the task so long as it is close enough in time to the utility signal to be efficacious), the first load (or the next in line in the sequence or all at once if organized in parallel) gets set to an ENABLED condition and the Override condition gets set to FALSE. This process 61 may be accomplished on a processor that is in controller 110 in FIG. 1 or by a centralized processor which could be, for example, associated with the user interface 90 of FIG. 1A. In the preferred embodiment all the processes 61–69b are performed on a processor like processor 16 of controller 110 and the enabled and override conditions are set centrally by setting a network variable.

So, by way of example, process 62 is a process which checks the value assigned to the network variable (i.e., that collection of data signals that is stored in memory for the control system network which represents a particular load or is used by all the load controllers) and, after determining its value, assigning the processor's next process call to either process 63 if the value is "ON" (or enabled) or to process 66 if the value is "OFF" (or disabled). This kind of thing is well within the grasp of the ordinary practitioner in the art and is most commonly done in software within the controller unit 110.

An exemplary platform for interprocessor communication, handling network variables and other tasks is provided under the tradename "LONWORKS™" by Echelon Corporation of California. Their processor units, called Neurons™ could also perform the processes described for the load controller herein described.

Going through the FIG. 5 diagram then, if the value for the load under consideration is ON, process 63 then checks for whether there is an active direct load control (or DLC) signal from the utility. A DLC signal is an indication by the utility that it needs to exercise direct control ("Direct Load Control") over electricity usage. If this signal (again, most effectively maintained as a network variable after it's initiation into the system through a utility gateway such as EI 13 of FIG. 1) is INACTIVE, in the preferred embodiment, then process 69 checks to see if the signal specifies or indicates a higher tier than the load under consideration and if it does, process 69 signals over 69a to indicate that the load should be shed or turned off process. Otherwise this signal goes via route 69b to initiate process 68 to turn the load on or keep it on. However, before turning off the load, route 69a is taken leading through process 65b.

Process 65b checks to see first if there is a pending override request (preferably by checking a network variable) and then checks to see if overrides are allowed (on this load or at all, depending on how the user configures his system in cooperation with the utility). If, and only if both questions are answered affirmatively, then process 68 is activated. Otherwise process 66 is activated, turning the load off.

If the DLC (process 63) is "ACTIVE", then a different process is initiated. First, the process 64 checks the duty cycle for its load. If the duty cycle currently equals one than the load is turned on, and if the duty cycle equals zero than the load is turned off, by definition, that means the load is off (even though it's enabled) and the next process is either to turn the load off or simply restart a timer process 67.

If there is a duty cycle, process 65a checks for override requests and whether they are allowed as did process 65b. Based on the same criteria, it may activate process 66 or process 68. (If so desired, for loads to which the concepts of duty cycle is irrelevant, process 64 may be eliminated but it is preferred here since it is accomplished with a convenient programming step.

While not preferred, changing the duty cycle time for responding to recently supplied tier information signals may be done instead, or even setpoint offsets might be used in appropriate circumstances.

For example, if in step 69 this alternative is chosen [ALT], then the processor would access a user-defined table of tier values corresponding to duty cycle percentages and the processor would then cause the duty cycle to change to correspond to the tier value sent.

To gain greater control, the user could then select to override such a charge through a process like 65B.

In general, any value laden signal could be called a "tier" signal. So, for example, if the utility provider sent signals corresponding to real time price data, the processor would have to be modified to respond to such data rather than to a "tier" level signal. It is presently felt that the simplicity provided by using a limited number of tier signals affords use of simpler processors and for that reason it is presently preferred. The practitioner of ordinary skill can easily adapt this invention to any type of consistent signaling mechanism.

As an additional feature, an override request is something decided between the utility and the user. This is an accommodation to the needs of both. For example, if the user cannot afford to have the lights turned off in a part of his plant, say, during a growth cycle for some bacteria he is growing, he can negotiate with the utility provider to either put that room, via its controller, into the highest tier, which will cost something the utility and user agree to. Alternatively, the user could maintain an override, or exclude DLC from the particular subsystem altogether. If the price is too steep for the value, the consumer/customer may agree to put his lights on a cycle timer 67 that only kicks in at the highest price (for example). If the value of keeping a set of lights on is not so great, but there are certain times at which the consumer will want to keep them on, say during a pool party, the appropriate adjustment would be to allow for the utility to control the pool light load through a DLC signal, but if the rates merely climb, to allow for a user override that stops the process from shutting down these lights at times when the rates are high. This is the level of control available through the addition of processes 65a and 65b to the preferred embodiment wherein the user may negotiate whether overrides of DLC are allowed.

Figure 4A:
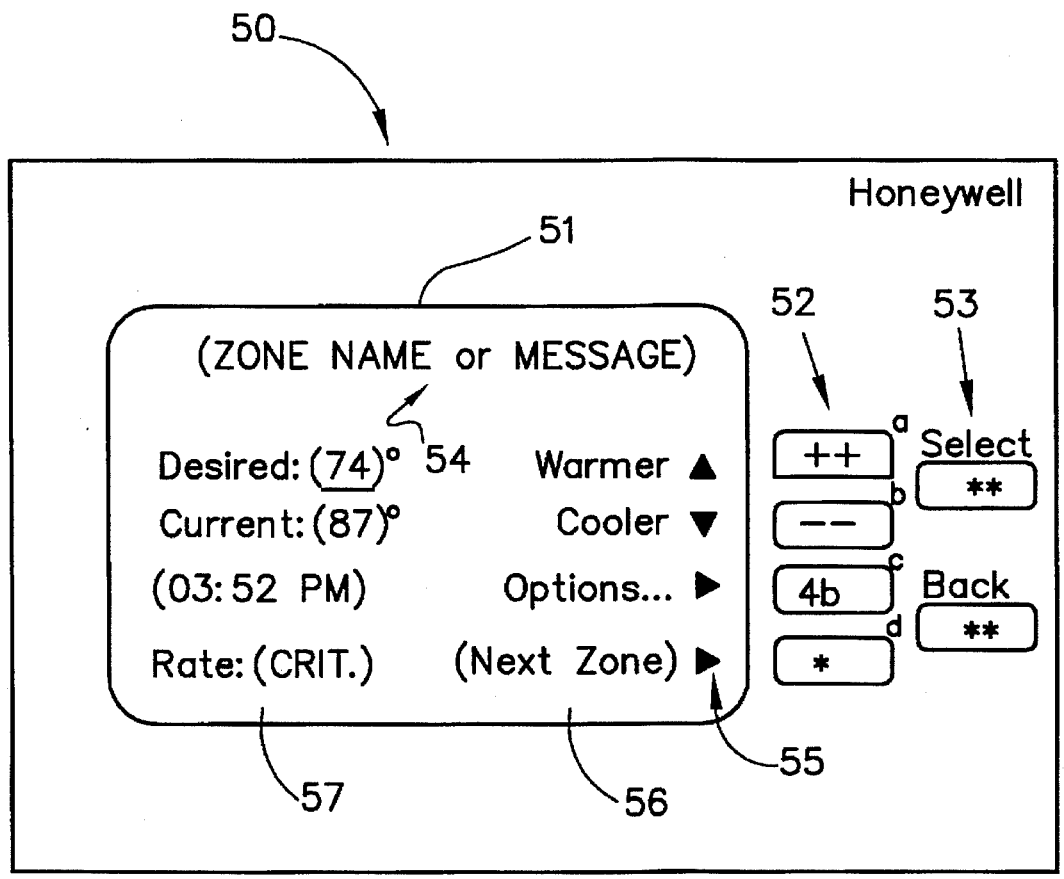
FIG. 4a is a model of the display used by one embodiment of this invention.
Figure 4B:
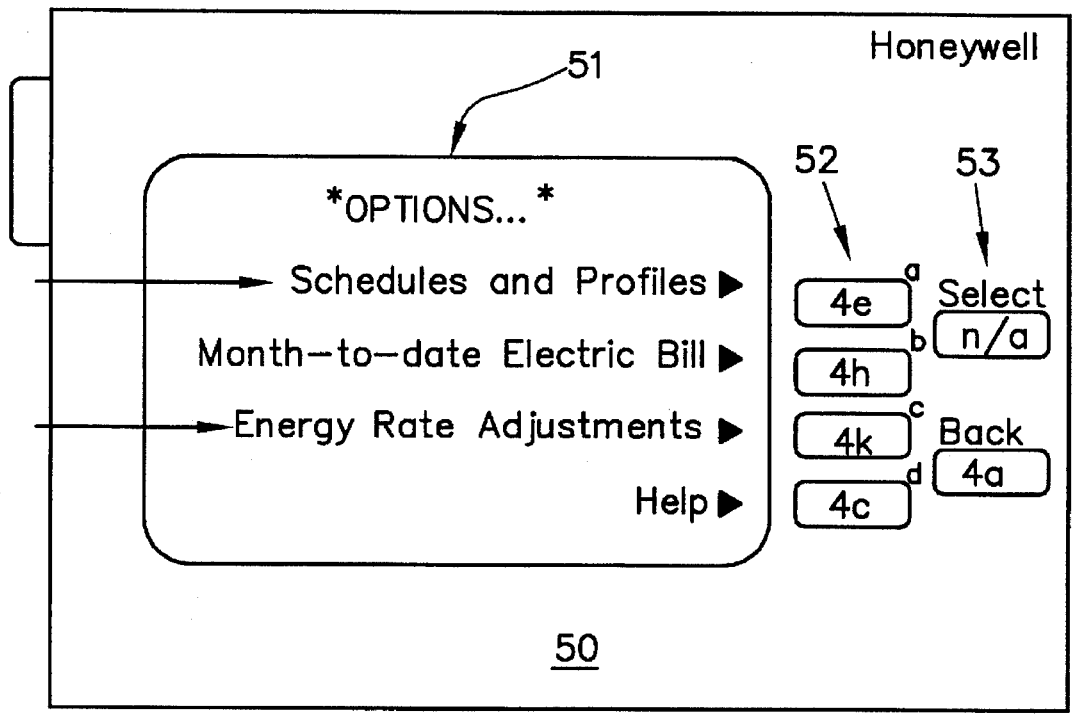
Figure 4C:
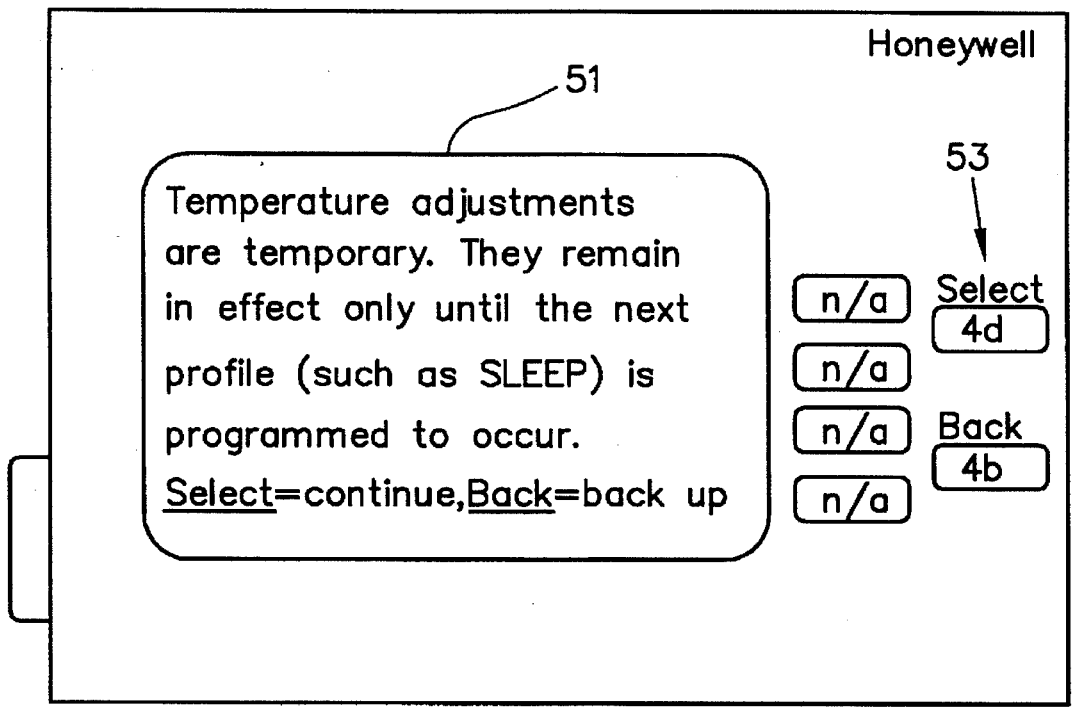
Figure 4D:
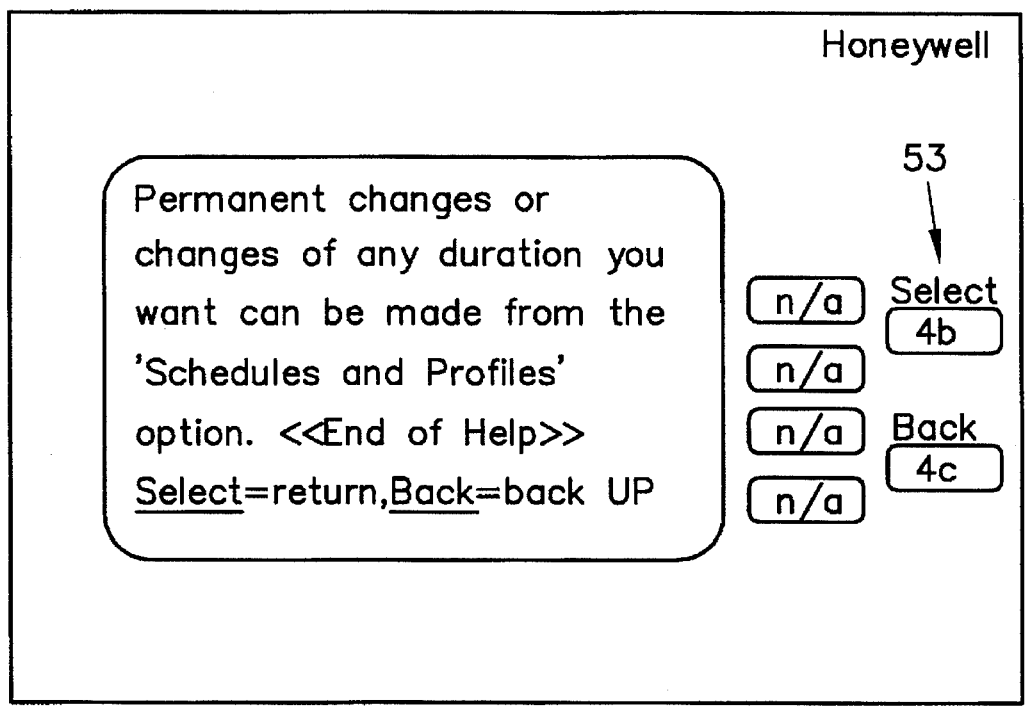
Figure 4E:
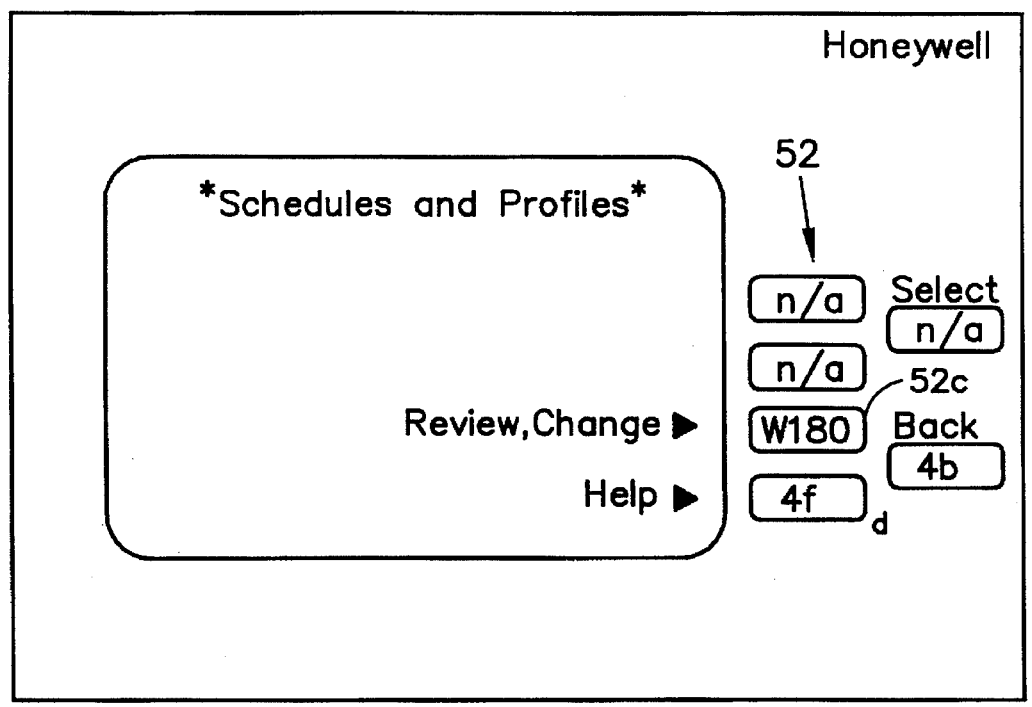
Figure 4F:
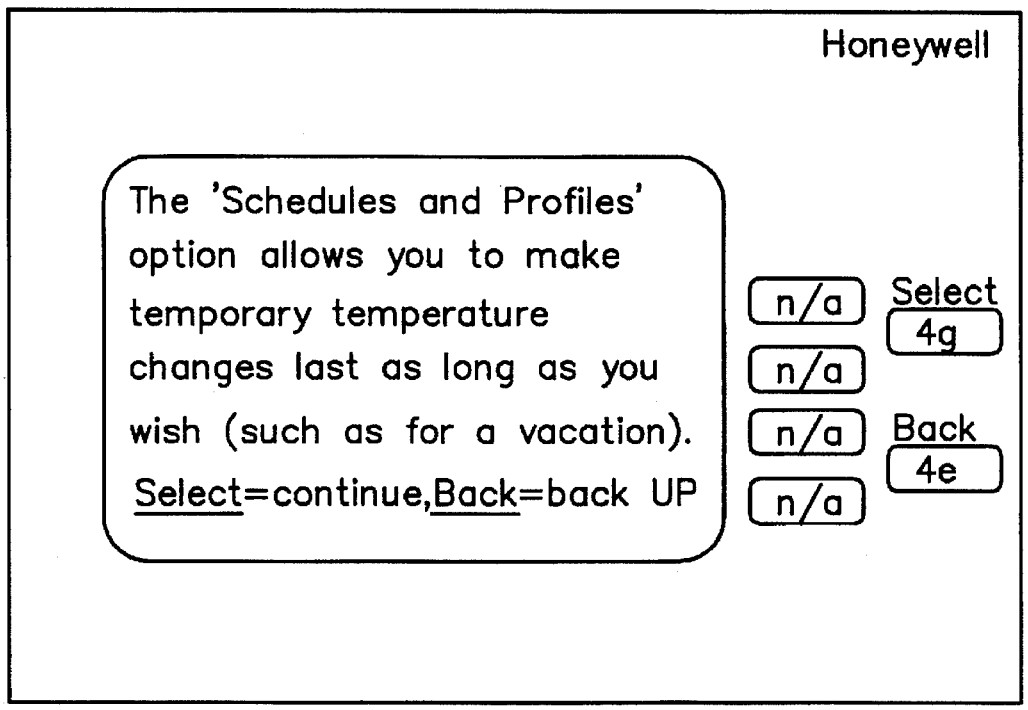
Figure 4G:
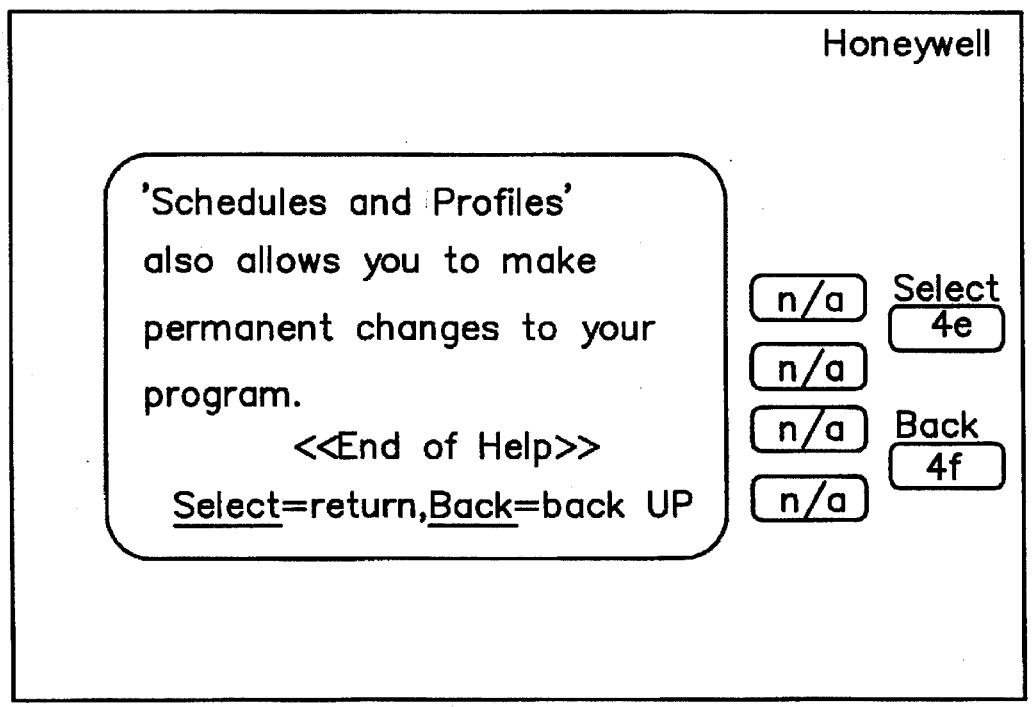
Figure 4H:
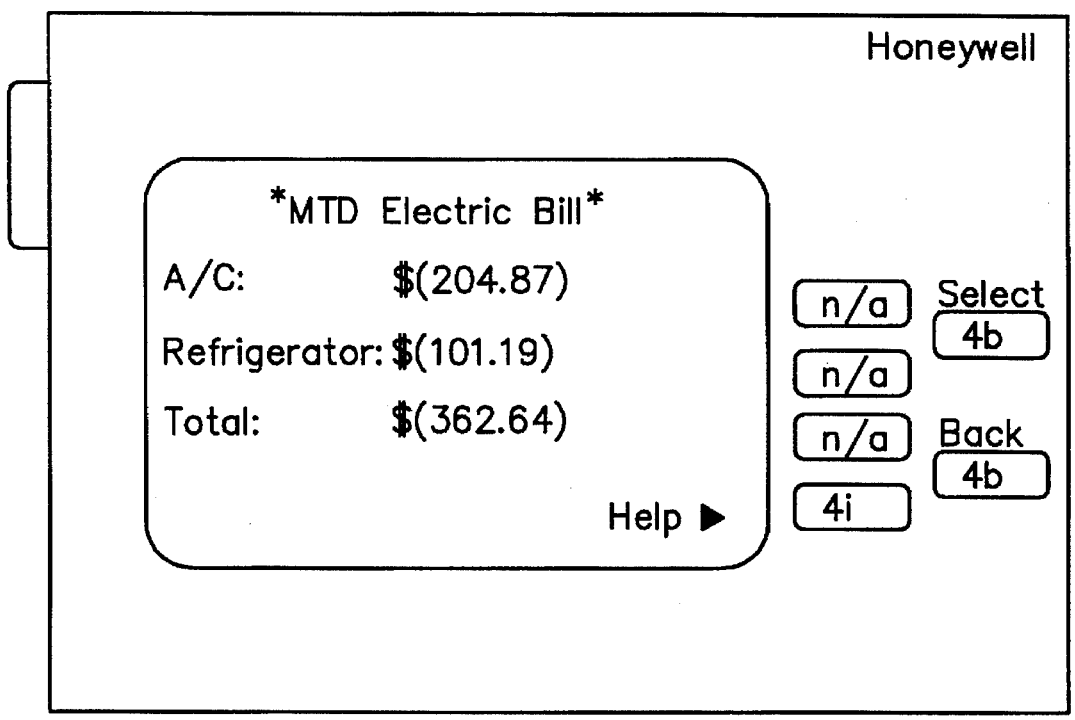
Figure 4I:
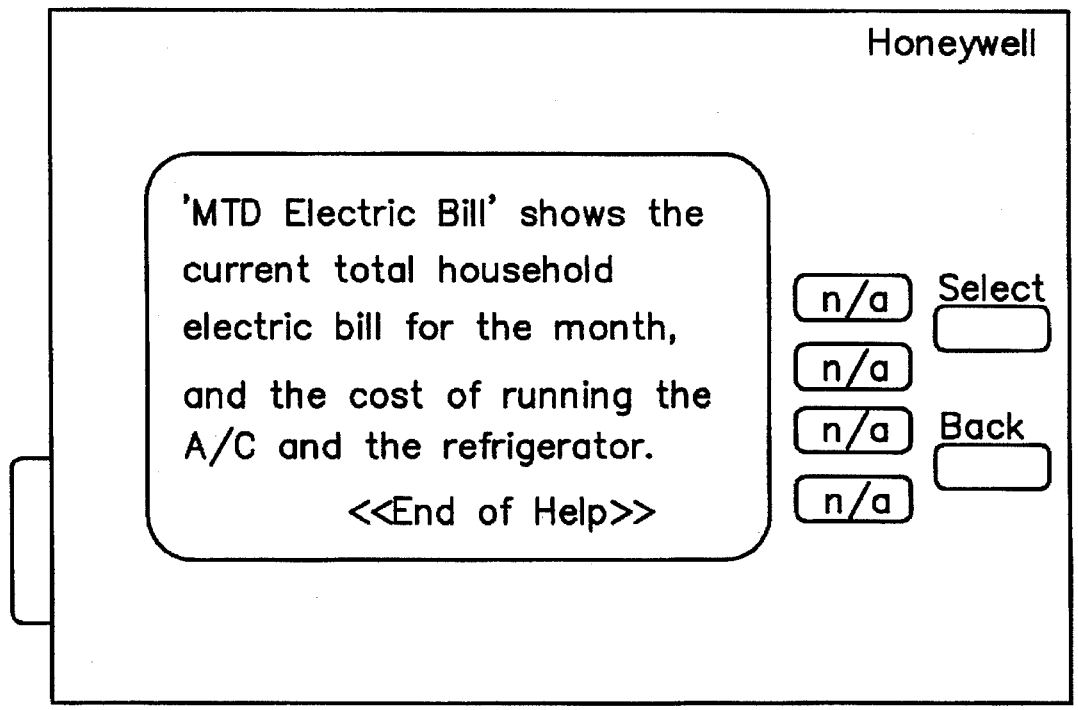
Figure 4K:
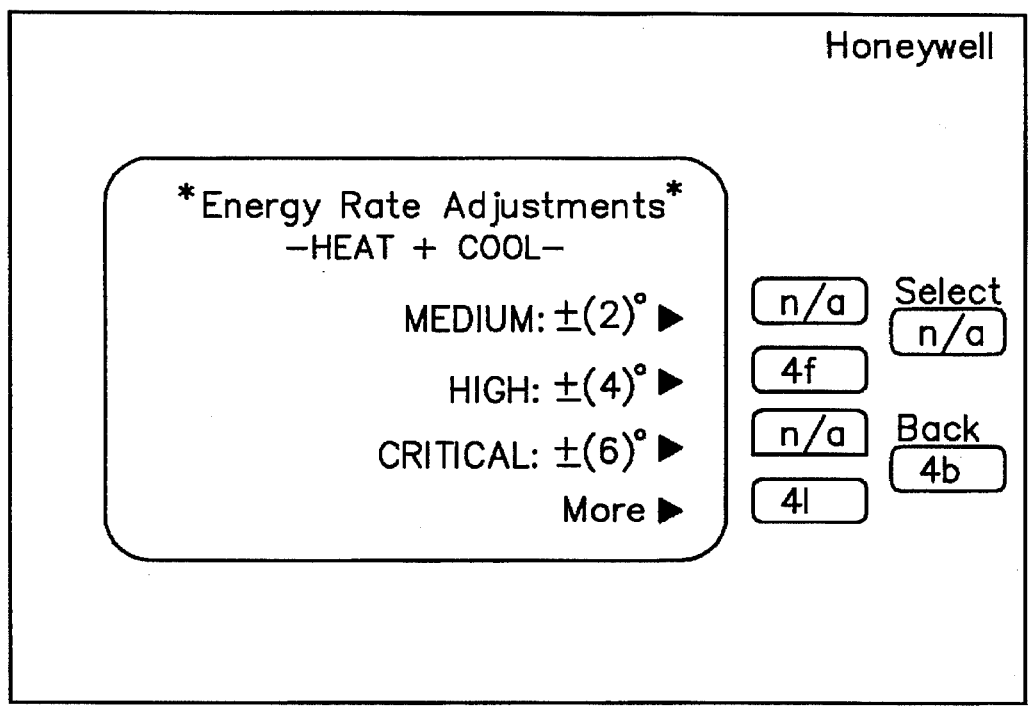
Figure 4L:
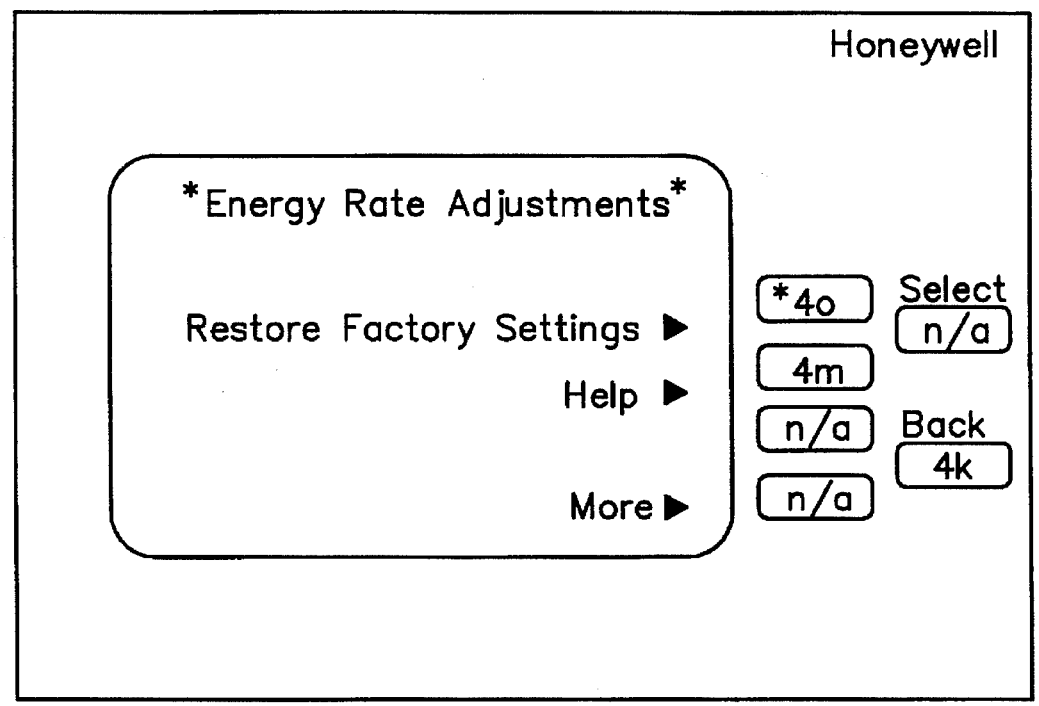
Figure 4M:
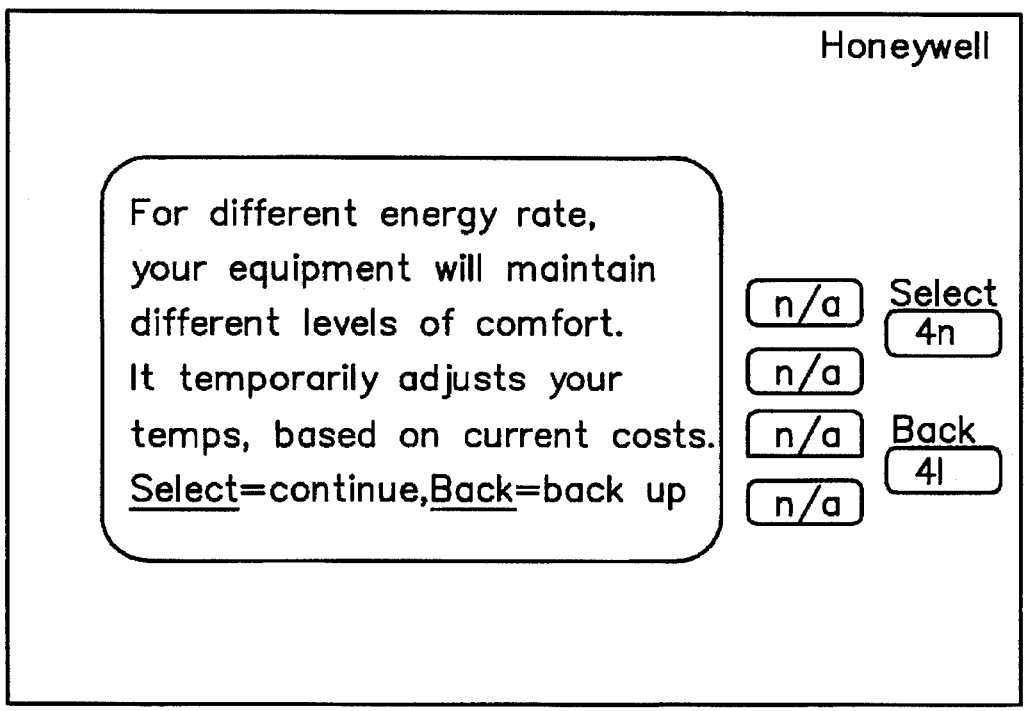
Figure 4N:
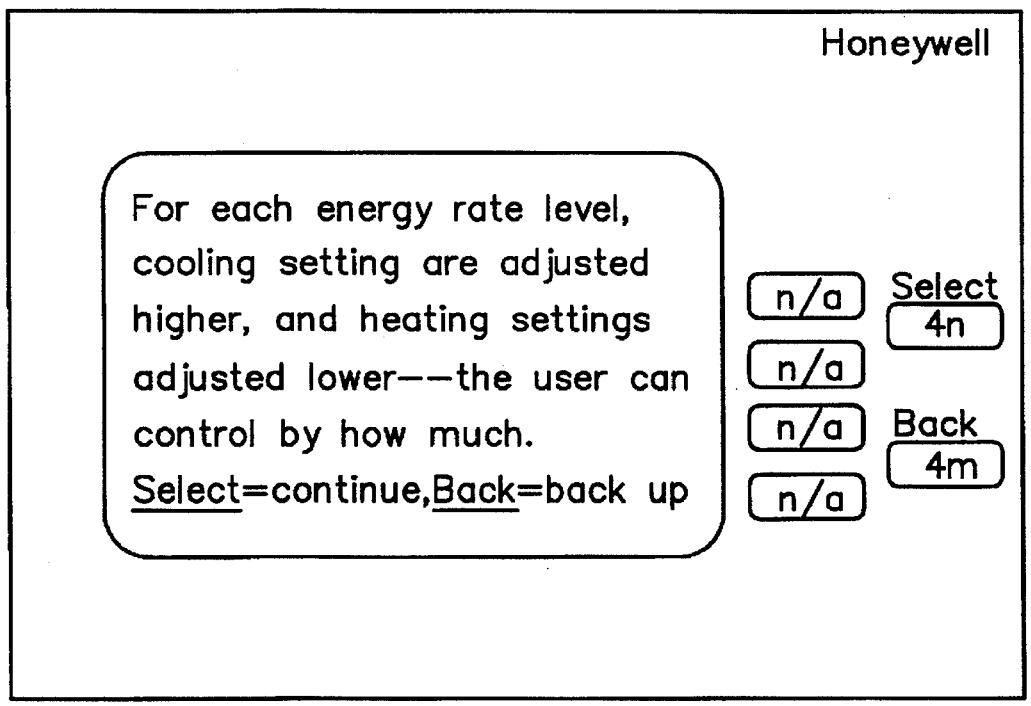
Figure 4O:
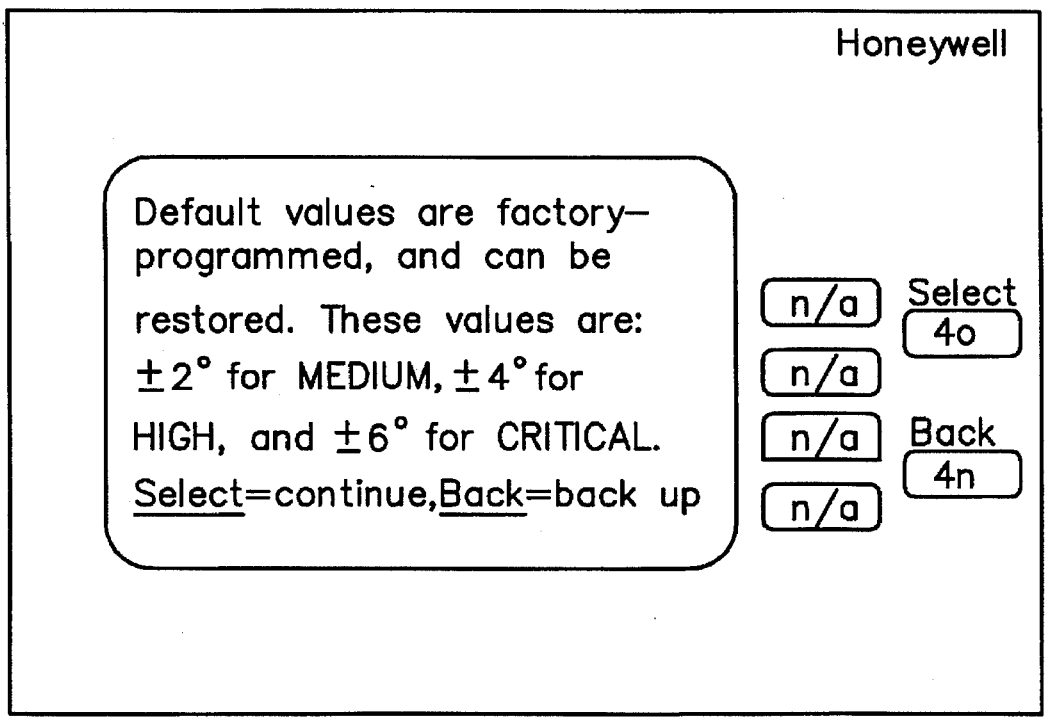
Figure 4P:
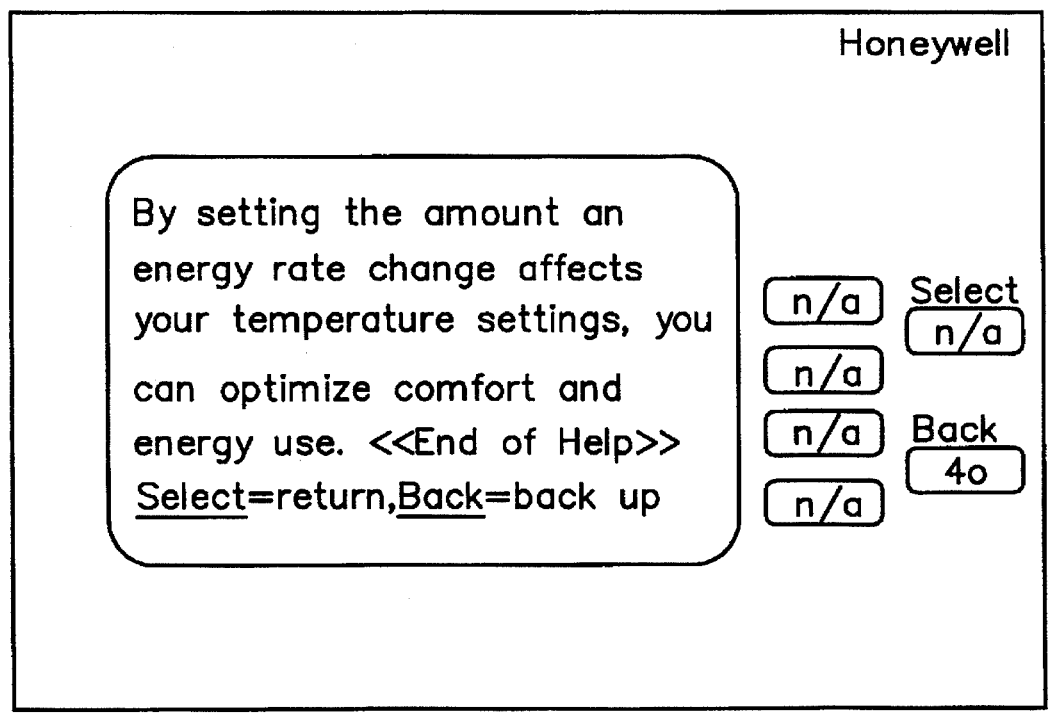
Figure 4Q:
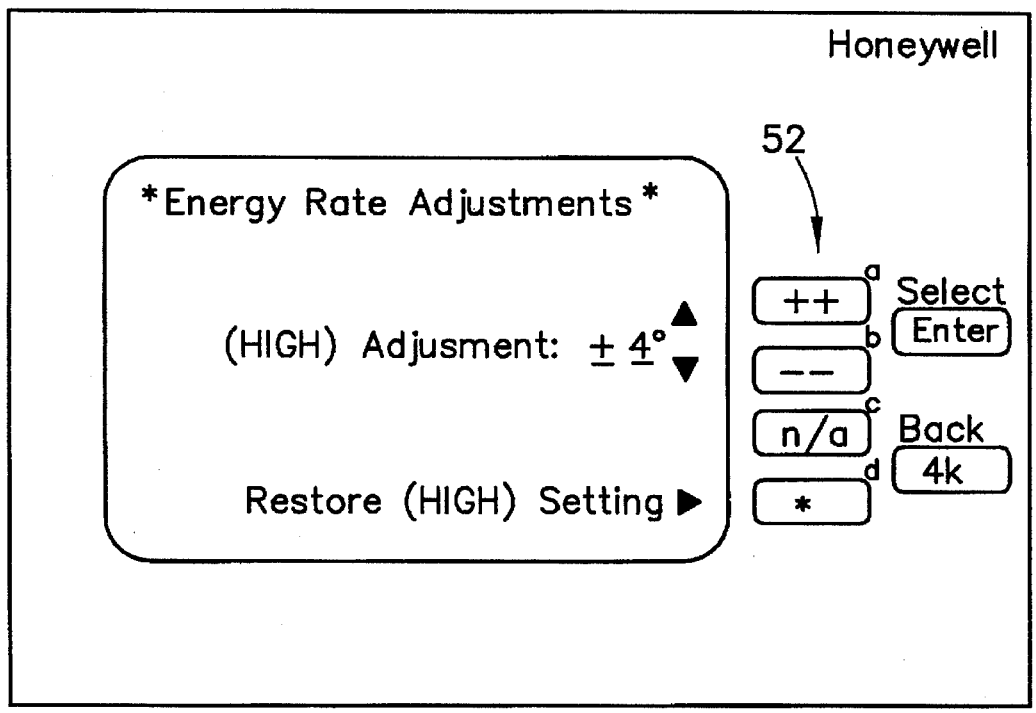
Figure 4R:
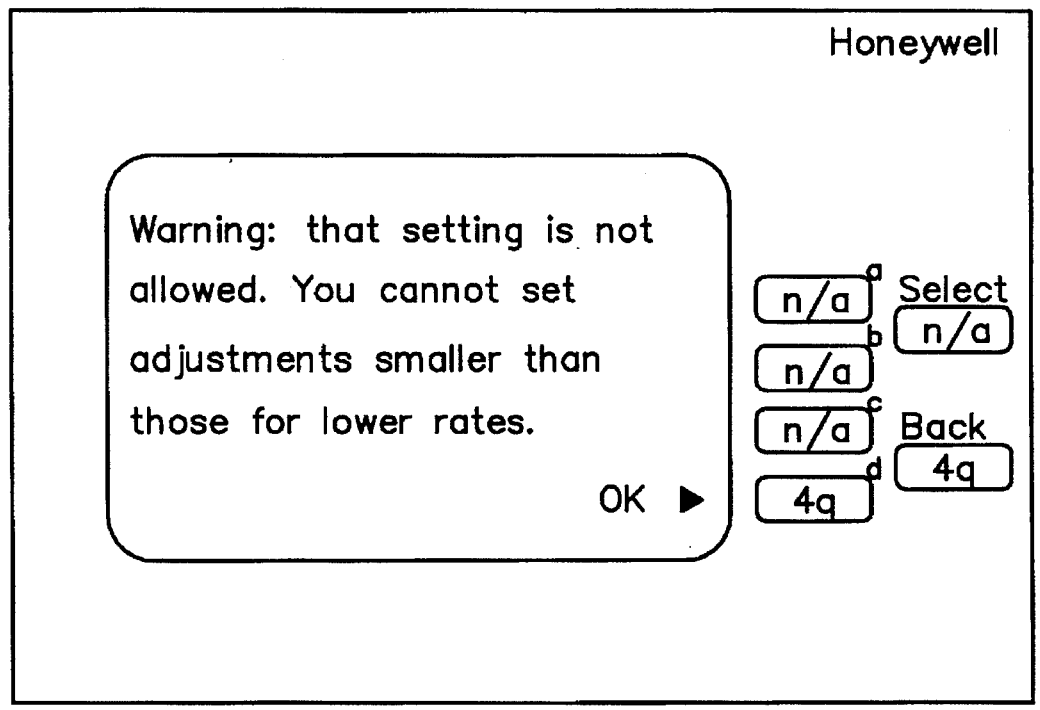

In the FIGS. 4a–r, a user interface panel 50 contains a display area 51, a set of four soft keys 52a, b, c, d, and two hard keys 53, Select and Back. Various configurations for data on the display 51 may be provided by other designers but in the preferred embodiment, arrows or other symbols 55 indicate the functions of the soft keys 52a–d by reference 56 associated with each such symbol 55. Where a display merely indicates information about the user's options, such as a help screen, a display configuration such as that shown in FIG. 4c may be provided in the preferred embodiments. In other cases, information 57 and a zone name or message 54 is preferably provided on the display 51 as in FIG. 4a. For ease of explanation, keys 52 and 53 contain information regarding their function which would not generally be available to the user. (For example, in FIG. 4a, key 52a has two "+" signs indicating that the function of softkey 52a is to increase the amount of warmth, and key 52b has two "–" signs to show that the amount of warmth should be decreased and that the setpoint should be reduced. These "++" and "—" keys will not be on the user touch pad but are included in these drawings to provide redundant information to the reader in order to facilitate the grasp of the inventive concepts of this document).

The use of softkeys allows the user to control it without requiring a complicated or expensive user interface such as a general-purpose computer. However, general purpose computers or other interface devices may be used if desired. Also if desired, the utility may provide for the actuation of particular profiles within individual spaces or homes directly, but this would require such a utility to maintain an active database and provide a method by which the users could modify that database to their own desires on some kind of acceptable basis.

Other symbols drawn onto the keys such as in FIG. 4b indicate that a display is available at another level. N/A would indicate that that particular key cannot perform any function with this particular display. N/S indicates a feature not shown or described.

While the FIGS. 4a–r provide a generalized set of displays for interfacing to a control system, other options are available.

Using an interface like the display of FIGS. 4a–r for add/shed control are convenient for complex systems, however, a less expensive alternative is available. If the user, for example a home owner, has only one or two systems that require or are amenable to load/shed control, he may prefer to simply interface directly with the load controller (LSM of FIG. 1, [Direct Control Interface DC and Switch SW]1A). For this purpose, a user interface consisting merely of a switch/button, or other user control could activate or deactivate any of the features described with reference to the processor's of process 60 in FIG. 5. To avoid any user contact, the utility may, if preferred, simply agree to install a hard-configured controller that, for example, does not allow for overrides or that controls through overrides through process 65b. A myriad of combinational variations occur to those of ordinary skill in the art when presented with these options.

To describe the interactive operation of the system vis-a-vis the user and utility, an example follows. If at 12 midnight an electric utility were to pull substantial load generation capacity offline, say, for maintenance, it would then send out a "top tier" signal over whatever communication pathway (FIG. 2) has been selected by the power company 20 to the utility interface to the customer's home, building, business or industrial facility (external interface, i.e., 13, FIG. 1 and 1a). A controller (which may be located in box 80 or 90 for instance) receives this information over bus 17 or directly from the external interface 13, it puts this out as a network variable to the add/shed controllers 110–110n. Each of the add/shed controllers then (after timeout is complete if one were pending) executes the processes described with reference to FIG. 5, starting at process 61.

The invention should not be considered limited, except as set forth in the following appended claims.

We claim:

1. A method for controlling the energy usage in a facility having individual controllers, each responsible for its own subsystems which have energy loads that can be in various states, comprising:

(a) receiving a price tier signal from a utility providing energy to said facility;

(b) communicating that signal to each processor responsible for the adding/shedding of each subsystem load;

(c) determining by each processor whether it is appropriate to shed its load based on information in the utility-provided signal, and;

(d) shedding by said processor of those loads for which it is responsible if appropriate.

2. The method of claim 1 wherein step (c) further comprises:

i) determining whether the load is on or off and, if off, leaving unchanged the state of said load; else ii) determining whether subsystem load tier value is greater than the utility-provided tier signal and, if so, causing said processor to wait for the next signal but still leaving unchanged said load state.

3. The method of claim 1 wherein step c) further comprises:

i) determining whether the load is on or off and, if off, leaving unchanged the state of said load; else ii) determining whether DLC is active or inactive and, if DLC is active, turning off the load and causing said processor to wait for the next signal; else, if the DLC is inactive, then iii) determining whether subsystem load tier value is greater than the utility-provided tier signal and, if so, leaving the state of the load unchanged and causing said processor to wait for the next signal.

4. The method of claim 2 wherein if the utility provided signal tier level is greater than said load's level, turning off said load and causing said processor to wait for the next signal.

5. The method of claim 3 wherein if the utility provided signal tier level is greater than said load's level, turning off said load and causing said processor to wait for the next signal.

6. The method of claim 1 wherein step c) further comprises:

(i) determining whether the load is on or off and, if off, causing said processor to wait for the next signal; else, if on (ii) determining whether DLC is active or inactive and, if DLC is active, determining if the duty cycle is currently off and, if so, checking the override and if the override is enabled, causing said processor to wait for the next signal.

7. The method of claim 6 wherein in step (ii), if the DLC is inactive, causing said processor to wait for the next signal.

8. The method of claim 6 wherein in step (ii), if the DLC is active, checking the value of the load against the tier value and if the incoming tier value is greater than or equal to the value of the load, then checking the override and, if the override is enabled, turning on the load and causing said processor to wait for the next signal.

9. The method of claim 6 wherein in step (ii), if the DLC is inactive, checking the value of the load against the tier value and if the incoming tier value is greater than the value of the load, then checking the override and, if the override is enabled, turning on the load and causing said processor to wait for the next signal.

10. The method of claim 8 wherein if the incoming tier value is less than the value of the load, adjusting the duty cycle to a matching tier level value.

11. The method of claim 7 wherein the duty cycle value is matched by the processor to a user-stored value related to said tier value.

* * * * *

UNITED STATES PATENT AND TRADEMARK OFFICE
CERTIFICATE OF CORRECTION

PATENT NO.  : 5,644,173
DATED       : July 1, 1997
INVENTOR(S) : Kurt L. Elliason, Robert J. Schnell,
              Philip J. Bohrer, Gregory J. Merten It is certified that error appears in the above-indentified patent and that said Letters Patent is hereby corrected as shown below:

Column 8, line 36, after "signal" insert --; else, turning off the load and then causing said processor to wait for the next signal--

Column 8, line 47, after "than" insert --or equal to--

Signed and Sealed this

Twenty-eighth Day of October, 1997

Attest:

BRUCE LEHMAN

Attesting Officer

Commissioner of Patents and Trademarks